United States Patent [19]
Cords et al.

[11] Patent Number: 5,655,429
[45] Date of Patent: Aug. 12, 1997

[54] HYDRAULIC PILOT BRAKE VALVE

[75] Inventors: Frederick W. Cords, Le Sueur; David E. Frye, North Mankato, both of Minn.

[73] Assignee: Commercial Intertech Corp., Youngstown, Ohio

[21] Appl. No.: 568,628

[22] Filed: Dec. 7, 1995

[51] Int. Cl.$^6$ ................................................ F15B 11/10
[52] U.S. Cl. ................................................ 91/431; 91/434
[58] Field of Search ..................... 60/553, 555; 91/431, 91/434

[56] References Cited

U.S. PATENT DOCUMENTS

| | | | |
|---|---|---|---|
| 2,424,331 | 7/1947 | Rose | 91/434 |
| 3,080,718 | 3/1963 | Clary | 91/434 |
| 3,182,443 | 5/1965 | Hermanns | 60/555 |
| 3,729,931 | 5/1973 | Shilton et al. | 60/555 |
| 3,899,890 | 8/1975 | Adams | 91/434 |
| 3,946,564 | 3/1976 | Makagawa | 91/434 |
| 4,280,395 | 7/1981 | Shaw | 91/431 |
| 5,186,003 | 2/1993 | Lebret | 60/555 |
| 5,346,289 | 9/1994 | Cords et al. | |
| 5,368,372 | 11/1994 | Cords et al. | |

Primary Examiner—F. Daniel Lopez
Attorney, Agent, or Firm—Faegre & Benson LLP

[57] ABSTRACT

A brake system with a hydraulic pilot brake valve for use in connection with a vehicle requiring finite brake control with high volume pressure control. The brake system includes the hydraulic pilot brake valve, a main hydraulic system, a control hydraulic system, and hydraulic brakes. The main hydraulic system includes a belt-driven hydraulic pump, a tank of hydraulic fluid, and an accumulator. The control hydraulic system includes an electrically actuated hydraulic pump and a tank of hydraulic fluid. The pilot brake valve is designed to control the flow of hydraulic fluid from the main hydraulic system to the hydraulic brakes, and includes a modulator chamber and a primary chamber. The modulator chamber houses a modulator piston valve, and the primary chamber houses a primary input piston which extends into a sleeve chamber of a sleeve. The modulator piston valve controls a modulating fluid flow from the control hydraulic system to generate amplified input forces on the input piston in the primary chamber. These input forces urge the input piston and sleeve toward extended positions, which controls the flow of hydraulic fluid from the main system to the brakes. The modulator piston valve is comprised of a modulator piston and a primary control piston, both being movable between retracted and extended positions and biased toward the retracted position, and a secondary control piston, which is capable of motion between extended and retracted positions.

15 Claims, 2 Drawing Sheets

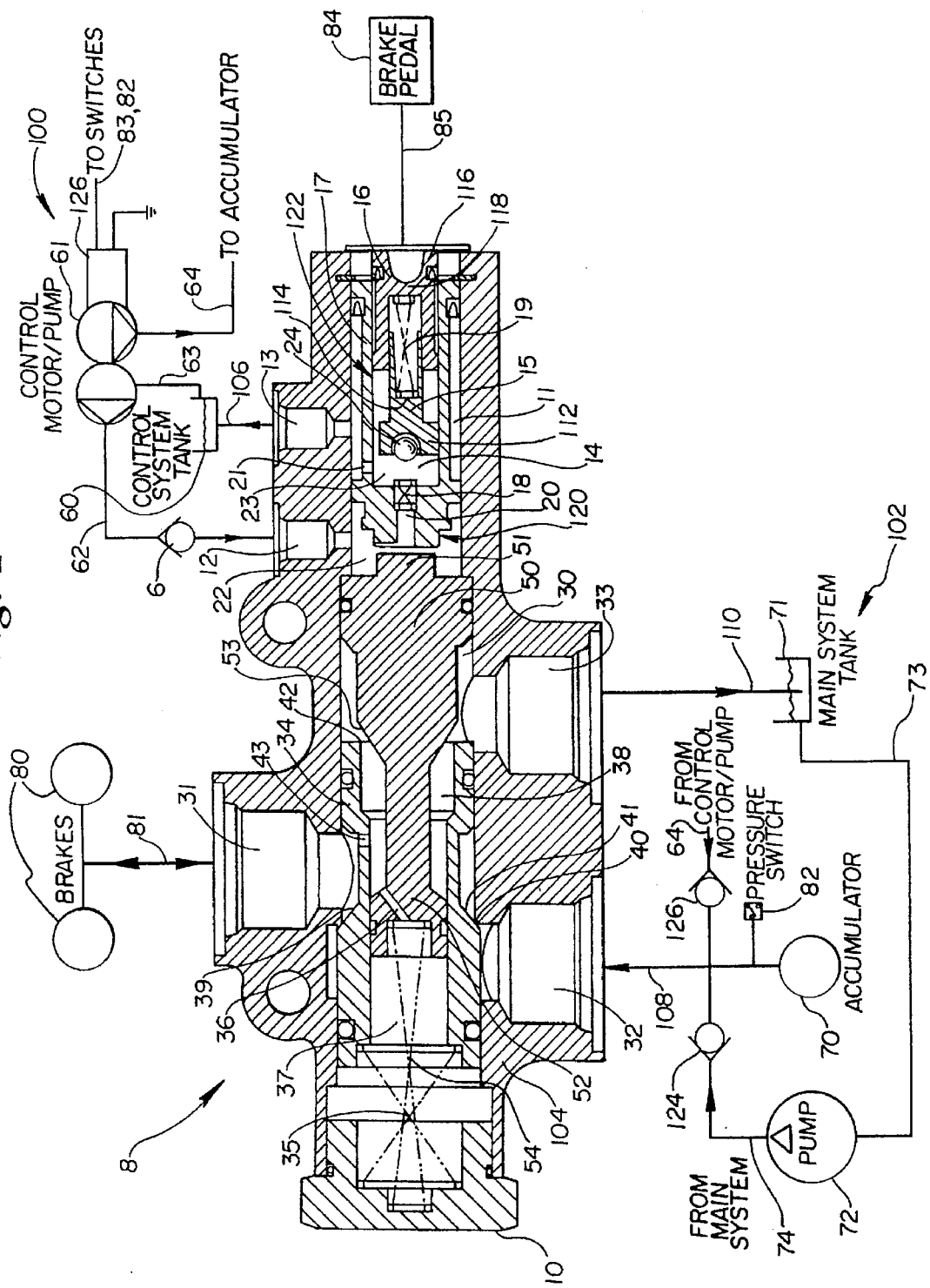

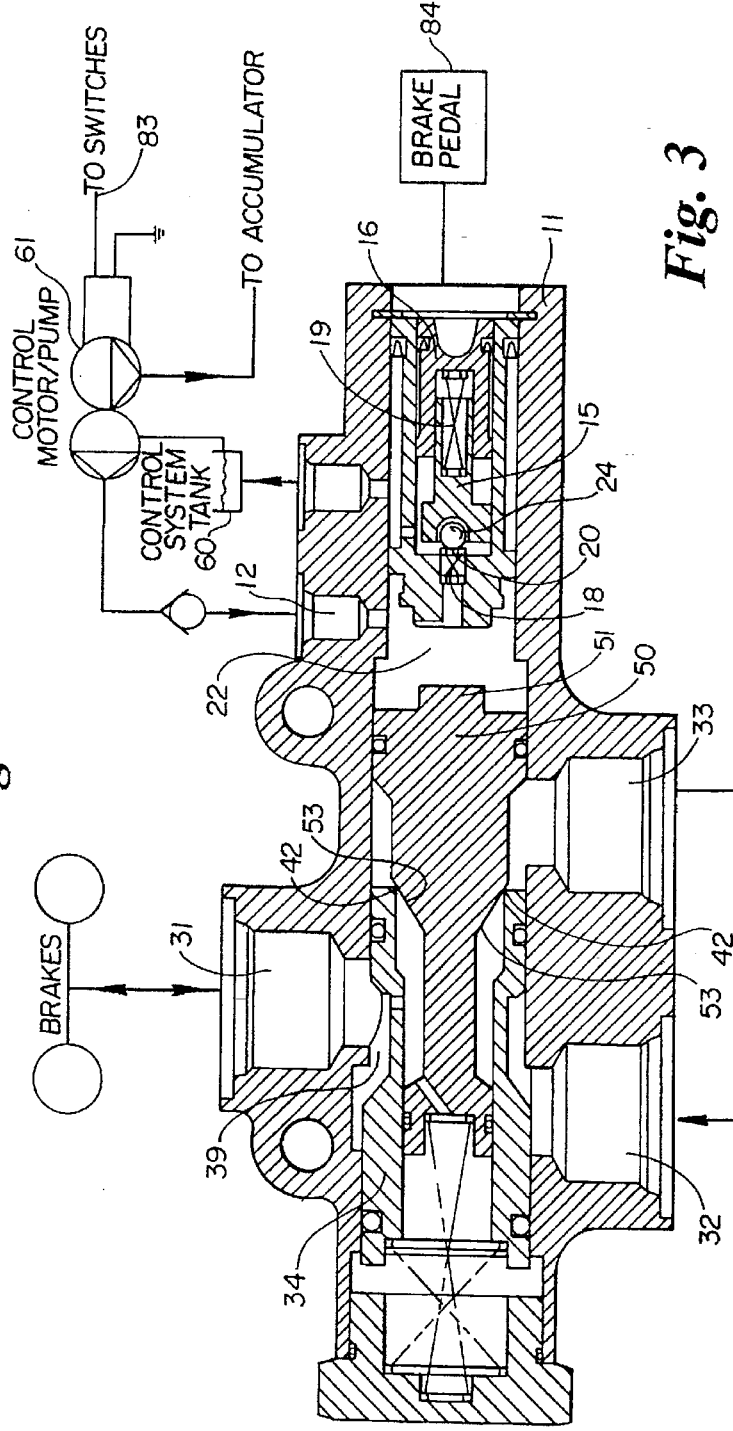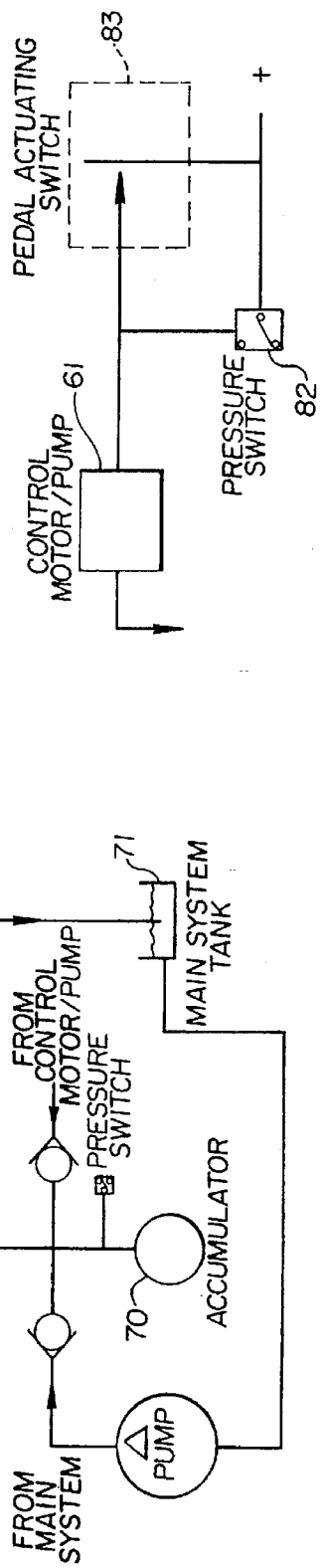

HYDRAULIC PILOT BRAKE VALVE

BACKGROUND OF INVENTION

1. Field of the Invention

The present invention is a hydraulic brake system and a hydraulic pilot brake valve for use in the system.

2. Description of the Related Art

Hydraulic brake systems are well known and in widespread use in cars, trucks, and other vehicles. Large, heavy vehicles and vehicles engaged in moving heavy loads require hydraulic brake systems that reliably deliver large braking forces. Current systems, however, are very complex. They often contain redundant systems for reliability in case one should fail. They also often include redundant parts, including dual brake actuator valves, dual accumulator charging valves, and dual accumulators, in case one part should fail. A large amount of tubing, hoses, and plumbing is required to incorporate these redundant systems and parts into current brake systems. There remains, therefore a continuing need for efficient, reliable hydraulic brake systems and valves for use therewith.

SUMMARY OF THE INVENTION

The present invention is a hydraulic brake system and a hydraulic pilot brake valve for use in the system. The overall system includes main and control hydraulic systems, hydraulic brakes, and the hydraulic pilot brake valve for controlling the flow of hydraulic fluid from the main hydraulic system to the brakes. One embodiment of the hydraulic pilot valve includes a valve housing, having a modulator valve chamber and a primary valve chamber adjacent to the modulator valve chamber. The valve housing further includes a control system inlet port and a control system tank port, both of which are in communication with the modulator valve chamber. A brake port, an accumulator port, and a main system tank port in the valve housing are in communication with the primary valve chamber. A modulator piston valve is located in the modulator valve chamber, and is movable between extended and retracted positions in response to external mechanical input forces. The modulator piston valve controls a modulating fluid flow between the control system inlet and tank ports to generate amplified input forces in response to the external mechanical input forces. A primary valve sleeve is located in the primary valve chamber and is movable between extended and retracted positions. The primary valve sleeve includes a sleeve chamber and structure for controlling the fluid flow from the main hydraulic system. The structure fluidly isolates the brake port and accumulator port when the sleeve is in the retracted position, and fluidly couples the brake port and accumulator port when the sleeve is forced toward the extended position. The primary valve sleeve further includes a sleeve port extending through the sleeve for fluidly coupling the sleeve chamber to the brake port. A primary valve sleeve spring biases the primary valve sleeve to the retracted position. A primary input piston extends into the sleeve chamber and moves from a retracted position toward an extended position in response to the mechanical forces and amplified input forces from the modulator piston valve. The primary input piston includes structure for fluidly coupling the sleeve chamber to the main system tank port when the piston is in the retracted position. This structure fluidly isolates the sleeve chamber and main system tank port and forces the primary valve sleeve toward the extended position when the piston is forced toward the extended position. A primary input piston spring biases the primary input piston to the retracted position.

In another embodiment of the hydraulic system the modulator piston valve further includes a piston which moves between extended and retracted positions in the modulator valve chamber. The piston includes a first end in fluid communication with the control system inlet port and a second end in fluid communication with the control system tank port. The first end is configured for engagement with the primary input piston. The piston further includes a port between the first and second ends. The modulator piston valve further includes a valve for controlling the flow of fluid through the first piston port, and a first piston actuating member. The actuating member moves between extended and retracted positions in response to external mechanical input forces. The member actuates the valve and forces the piston toward the extended position in response to the mechanical input forces. A second piston actuating member is also included in the modulator piston valve. The second piston actuating member moves between extended and retracted positions in response to external mechanical input forces and fluid forces, engages the first piston actuating member, and forces the first piston actuating member toward the extended position. A modulator piston valve spring is positioned between the first and second piston actuating members.

BRIEF DESCRIPTION OF THE DRAWINGS

FIG. 1 is a schematic diagram of a hydraulic brake system in accordance with the present invention, including a cross-sectional view of the pilot brake valve. The figure illustrates the pilot brake valve in a retracted position.

FIG. 2 is a schematic diagram of the hydraulic brake system shown in FIG. 1, illustrating the pilot brake valve in a partially extended position.

FIG. 3 is a schematic illustration of the pedal actuated and pressure switches.

DETAILED DESCRIPTION OF THE PREFERRED EMBODIMENTS

A hydraulic brake system 8 including a valve 10 in accordance with the present invention is illustrated generally in FIG. 1. Valve 10 is coupled to a control hydraulic system 100, and controls the flow of hydraulic fluid from a main hydraulic system 102 to vehicle brakes 80 in response to the actuation of vehicle brake pedal 84. Brakes 80 and the main hydraulic system 102 can be of any conventional or otherwise known design. In the embodiment shown, main hydraulic system 102 includes main system tank 71 of hydraulic fluid, main system pump 72, and accumulator 70. The control hydraulic system 100 includes control system tank 60 of hydraulic fluid and control system pump 61. Brake pedal 84 is coupled to valve 10 by a conventional linkage 85.

Valve 10 is comprised of a valve housing 104 and includes a modulator valve chamber 11 and a primary valve chamber 30. A modulator piston valve 14 is positioned in modulator valve chamber 11, and modulates fluid flow of hydraulic fluid from the control hydraulic system 100. Modulator piston valve 14 is comprised of a first piston actuating member or modulator piston 15, a second piston actuating member or primary control piston 16, and secondary control piston 17. The secondary control piston 17 is capable of moving freely in the modulator valve chamber 11, and includes a head portion 120 with a cylindrical sleeve portion 122. The sleeve portion 122 forms a chamber 23 in which modulator piston 15 and primary control piston 16 are mounted for reciprocal motion between retracted and extended positions. The modulator piston 15 and the primary control piston 16 are biased to retracted positions by secondary piston spring 18 and modulator piston valve spring 19, respectively. Passage 20 extends through the head portion 120 of the secondary control piston 17. Secondary control piston port 21 extends through the sleeve portion 122. A fluid flow path therefore extends between control system inlet port 12 and control system tank port 13.

Primary input piston 50 is positioned in primary valve chamber 30, and is mounted for reciprocal motion between retracted and extended positions. Primary input piston 50 is biased to the retracted position by primary input spring 54. Primary valve sleeve 34 is also positioned in the primary valve chamber 30, is mounted for reciprocal motion between retracted and extended positions, and is biased to the retracted position by primary valve sleeve spring 35. Primary valve sleeve 34 is generally cylindrical, and forms a sleeve chamber 38 in which primary input piston 50 moves. Primary valve sleeve 34 further includes brake port valley 39 to establish a fluid flow path in the primary valve chamber 30.

The flow of hydraulic fluid from the control hydraulic system 100 into and out of the modulator valve chamber 11 occurs through the control system inlet port 12 and the control system tank port 13. Control system inlet port 12 of valve housing 104 is fluidly coupled to control system pump 61 through hydraulic fluid line 62, which includes a check valve 6. The control system tank port 13 is fluidly coupled to the control system tank 60 through line 106. Control system pump 61 is connected to receive hydraulic fluid from control system tank 60 through hydraulic fluid line 63. Chamber 22 of the modulator valve chamber 11, passage 20 of the secondary control piston 17, and chamber 23 of the sleeve portion 122 of the secondary control piston 17 fluidly couple control system inlet port 12 to control system tank port 13 through secondary control piston port 21 in the secondary control piston 17.

The modulator piston valve 14 controls this flow of hydraulic fluid between control system inlet port 12 and control system tank port 13 and is configured to generate input forces on the primary input piston 50 in response to external input forces. Modulator piston 15 has first and second opposite ends 112 and 114, respectively, and is biased to the retracted position, moveable toward the extended position in sleeve portion 122 of the modulator valve chamber 11. A valve ball 24 is mounted on the first end 112 of the modulator piston 15. Primary control piston 16 has input and reaction ends 116 and 118, respectively, and also is biased toward the retracted position, moveable toward the extended position in sleeve portion 122 of the modulator valve chamber 11. Brake pedal 84 is mechanically connected to the input end 116 of piston 16 by linkage 85. Modulator piston valve spring 19 is mounted between the second end 114 of modulator piston 15 and the reaction end 118 of primary control piston 16. External mechanical input through the brake pedal 84 causes the primary control piston 16 and the modulator piston 15 to move toward the extended position from the retracted position, thereby causing the modulator piston valve 14 to close when valve ball 24 is urged toward passage 20 of secondary control piston 17 and secondary piston spring 18. In this manner, the flow of hydraulic fluid through the modulator valve chamber 11 is restricted, since passage 20, chamber 22, and control system inlet port 12 are fluidly isolated from chamber 23 and control system tank port 13. This flow restriction generates amplified fluid forces as fluid pressure builds in chamber 22.

The flow of hydraulic fluid from the main hydraulic system 102 into and out of the primary valve chamber 30 occurs through the accumulator port 32, the brake port 31, and the main system tank port 33. Accumulator port 32 in valve housing 104 is fluidly coupled to accumulator 70 through hydraulic fluid line 108, while the main system tank port 33 of valve housing 104 is fluidly coupled to the main system tank 71 through line 110. Main system pump 72 is connected to receive hydraulic fluid from the main system tank 71 through hydraulic fluid line 73, and is further fluidly coupled to the accumulator 70 through hydraulic fluid line 74, which includes a check valve 124. Accumulator 70 is also fluidly coupled to control system pump 61 through hydraulic fluid line 64, which includes a check valve 126. Brake port 31 in valve housing 104 is fluidly coupled to brakes 80 through hydraulic fluid line 81. Brake port valley 39 of the primary valve sleeve 34 fluidly couples accumulator port 32 to brake port 31 when the primary valve sleeve 34 is in the extended position. In its retracted position, primary valve sleeve 34 isolates (closes) accumulator port 32 while sleeve chamber 38 and primary valve chamber 30 couple the brake port 31 to the main system tank port 33 through sleeve port 43 in the primary valve sleeve 34.

The primary input piston 50 and the primary valve sleeve 34 control the flow of fluid through primary valve chamber 30 and between the main hydraulic system 102 and the brakes 80. Primary input piston 50 has input and reaction opposite ends 51 and 52 and tapered sleeve engaging surface 53. The reaction end 52 has a reservoir port 36 for fluid flow from the sleeve chamber 38 into the reservoir chamber 37. Primary input piston spring 54 is mounted between valve housing 104 and the reaction end 52. Brake port valley 39 of primary valve sleeve 34 has a tapered edge 41, and primary valve sleeve 34 has a shoulder 42. Primary valve sleeve spring 35 is mounted between valve housing 104 and the primary valve sleeve 34. As illustrated in FIG. 1 and more fully described below, when biased to the retracted position, tapered edge 41 of brake port valley 39 engages a shoulder 40 of the valve housing 104, thereby isolating accumulator port 32 and restricting the flow of fluid into the primary valve chamber 30. In its retracted position, tapered sleeve engaging surface 53 of the primary input piston is disengaged from shoulder 42 of the primary valve sleeve 34, thereby establishing a fluid flow path between the brake port 31 and the main system tank port 33. As illustrated in FIG. 2 and more fully described below, the tapered sleeve engaging surface 53 of primary input piston 50 engages shoulder 42 of the primary valve sleeve 34 when the primary input piston 50 moves from the retracted toward the extended position, thereby forcing the primary valve sleeve 34 toward the extended position, and thus creating a fluid flow path from the main hydraulic system 102 to the brakes 80.

Main system pump 72 is typically driven by the main hydraulic charging system (not shown) of the vehicle on which this brake system is mounted. Main system pump 72 is therefore switched on when the vehicle main hydraulic charging system is in use. Main system pump 72 pumps hydraulic fluid from the main system tank 71 into the accumulator 70, pressurizing accumulator 70 to a predetermined level. Control system pump 61 includes and is driven by an electric motor 126, which is coupled to a battery or an appropriate power source (not shown) by brake switch 83 and pressure switch 82 (FIG. 3). Control system pump 61 is therefore turned on when either the brake switch 83 or the pressure switch 82 is in the electrically closed state, and is turned off when both switches are in the electrically open state. Brake switch 83 is set to the electrically closed state by external input to the brake pedal 84 from the operator of the vehicle on which the invention is mounted, and is otherwise in the electrically open state. Pressure switch 82 is set to the electrically closed state whenever the pressure level in the accumulator 70 is below a predetermined level, and is in the electrically open state whenever the accumulator pressure is at or above the predetermined level. In this manner, the control hydraulic system 100 can be used to maintain pressure in the accumulator 70 and functions as a back-up to the main hydraulic system.

The operation of the hydraulic system 8 when the components of valve 10 are in the retracted position (i.e. when the brakes 80 are not actuated) can be described with reference to FIG. 1. When the control system pump 61 is turned on either through operator input closing the brake switch 83 or accumulator pressure falling below the predetermined level and closing the pressure switch 82, hydraulic fluid from the control hydraulic system 100 flows from the control system tank 60, through the control system inlet port 12 and into the modulator valve chamber 11 and chamber 22. With the primary control piston 16 and the modulator piston 15 in the retracted position, the modulator piston valve 14 remains in the open state, and hydraulic fluid flows into chamber 23. The fluid then flows through secondary control piston port 21, through control system tank port 13 and back into the control system tank 60.

With fluid circulating through the modulator valve chamber 11, the components of the chamber are not fluidly coupled to the primary input piston 50. The primary input piston 50 and the primary valve sleeve 34 thus remain biased to the retracted position. In its retracted position, tapered edge 41 of the primary valve sleeve 34 engages shoulder 40 of the valve housing 104, thus isolating accumulator port 6 and sealing off the flow of hydraulic fluid from the main hydraulic system 102 and the accumulator 70 to the brakes 80. The tapered sleeve engaging surface 53 of the primary input piston 50 is disengaged from shoulder 42 of the primary valve sleeve 34, thus fluidly coupling the brake port 31 and the main system tank port 33. Hydraulic fluid that had been forced into the brakes 80 thus flows back through the brake port 31, into the brake port valley 39, through sleeve port 43 and into sleeve chamber 38. From sleeve chamber 38, the fluid flows either through the reservoir port 36 in the reaction end 52 of the primary input piston 50 and into the reservoir chamber 37, or it flows through the main system tank port 33, into primary valve chamber 30, and back into the main system tank 71. Hydraulic fluid in the reservoir chamber 37 helps to maintain the primary valve sleeve 34 and the primary input piston 50 in the retracted position and provides "pedal feel" for the operator of the vehicle on which the invention is mounted.

As shown in FIG. 2, operator input through brake pedal 84 forces the components of valve 10 toward the extended position, thereby actuating the brakes 80. Operator input through the brake pedal 84 closes the brake switch 83, which turns the control system pump 61 on and starts the flow of fluid in the modulator valve chamber 11. The operator input force moves the primary control piston 16 toward the extended position, which in turn forces the modulator piston valve spring 19 to contract and mechanically couples the primary control piston 16 and the modulator piston 15. The modulator piston valve spring 19 exerts a force on the modulator piston 15, forcing it toward the extended position, thereby closing the modulator piston valve 14 by engaging the valve ball 24 with the secondary piston spring 18. This fluidly isolates chamber 22, and reduces the flow of fluid in the modulator valve chamber 11. With the modulator piston valve 14 restricted, the hydraulic fluid remains in chamber 22 and builds up pressure in the modulator valve chamber 11 between the input end 51 of the primary input piston 50 and the head 120 of the secondary control piston 17.

The pressure buildup in chamber 22 exerts a force against the input end 51 of the primary input piston 50. The force exerted on input end 51 moves the primary input piston 50 toward the extended position. Tapered sleeve engaging surface 53 of the primary input piston 50 engages shoulder 42 of the primary valve sleeve 34, thus mechanically coupling the components, and fluidly isolates the main system tank port 33. This seals off the fluid flow path into the main system tank 71. The contact between the tapered sleeve engaging surface 53 and the shoulder 42 moves the primary valve sleeve 34 toward the extended position, thus fluidly coupling the brake port valley 39 and the accumulator port 32. A pressurized fluid flow path is therefore established between the accumulator 70 and the brakes 80. The accumulator 70 then forces hydraulic fluid through the accumulator port 32, the brake port valley 39, the brake port 31, and to the brakes 80. The flow of fluid from the accumulator 70 to the brakes 80, and the corresponding braking force, will modulate in proportion to the input force from the brake pedal 84. As the primary input piston 50 moves from the retracted toward the extended position, fluid in reservoir chamber 37 flows back through reservoir port 36 in the reaction end 52 of the primary input piston 50, and joins the pressurized fluid flow path to the brakes 80.

FIG. 3 is a schematic illustration of the electrical system brake and pressure switches 83 and 82, respectively. As detailed above, the control system pump 61 is electrically connected to both the pressure switch 82 and the brake switch 83. Upon sensing that the accumulator 70 is below its predetermined pressure level, the pressure switch 82 closes and turns control system pump 61 on. Similarly, the brake switch 83 closes and turns the control system pump 61 on due to operator input through the brake pedal 84 and the brake pedal linkage 85.

The invention is also capable of operating in fail-safe modes should the main charging system or the electrical system controlling the control system pump 61 be inoperable. Upon a main system failure, the main system pump 72 may not be capable of charging the accumulator 70 to the predetermined level. However, any pressure deficiency causes the pressure switch 82 to close, thus turning the control system pump 61 on, which then charges the accumulator 70 to the predetermined level. In this manner, the invention enables pressurized fluid to flow to the brakes 80 even if the main charging system is not operating.

Should the electrical system on the vehicle not function properly, including those portions of control hydraulic system 100, thereby causing the control system pump 61 to become inoperative, the brake system can still operate. Operator input through brake pedal 84 will move the primary control piston 16 and the modulator piston 15 into the extended position and engage the valve ball 24 and secondary piston spring 18, thereby mechanically coupling the components. With no fluid flow from the control system pump 61, however, no pressure will build up in chamber 22, and the contact between valve ball 24 and the secondary piston spring 18 will exert a force on the secondary control piston 17 and force it toward the extended position. This will mechanically couple the secondary control piston 17 to the input end 51 of primary input piston 50. From this point on, the pilot brake valve will operate in a manner similar to that described above, with the primary input piston 50 moving toward the extended position and engaging the primary valve sleeve 34, which in turn fluidly couples the accumulator 70 to the brakes 80.

When the main system and electrical system are inoperative, the brake system can still operate. In this case, the modulator valve chamber 11 will operate at described in the preceding paragraph, with the primary input piston 50 being mechanically coupled to the secondary control piston 17 by the actuation of the brake pedal 84 by the vehicle operator. The accumulator 70 will subsequently be fluidly coupled to the brakes 80, with the existing pressure level of the accumulator 70 forcing hydraulic fluid to the brakes 80. Without either the main system pump 72 or the control system pump 61 to maintain this pressure, the brakes 80 will continue to operate, but without the assistance of the hydraulic system beyond the initial burst from the accumulator 70.

Although the present invention has been described with reference to preferred embodiments, those skilled in the art will recognize that changes can be made in form and detail without departing from the spirit and scope of the invention.

What is claimed is:

1. A hydraulic pilot valve, including:
   a valve housing, comprising:
      a modulator valve chamber;
      a control system inlet port in communication with the modulator valve chamber;
      a control system tank port in communication with the modulator valve chamber;
      a primary valve chamber adjacent to the modulator valve chamber;
      a brake port in communication with the primary valve chamber;
      an accumulator port in communication with the primary valve chamber; and
      a main system tank port in communication with the primary valve chamber;
   a modulator piston valve in the modulator valve chamber, the modulator piston valve movable between extended and retracted positions in response to external mechanical input forces, and modulates the fluid flow between the control system inlet and tank ports to generate amplified input forces in response to the external mechanical input forces;
   a primary valve sleeve in the primary valve chamber and movable between extended and retracted positions, including:
      a sleeve chamber;
      structure for fluidly isolating the brake port and accumulator port when the sleeve is in the retracted position, and for fluidly coupling the brake port and accumulator port when the sleeve is forced toward the extended position; and
      a sleeve port extending through the sleeve for fluidly coupling the sleeve chamber to the brake port;
   a primary valve sleeve spring for biasing the primary valve sleeve to the retracted position;
   a primary input piston extending into the sleeve chamber and movable from a retracted position toward an extended position in response to the mechanical forces and amplified input forces from the modulator piston valve, the primary input piston including structure for fluidly coupling the sleeve chamber to the main system tank port when the piston is in the retracted position, and for fluidly isolating the sleeve chamber and main system tank port and forcing the primary valve sleeve toward the extended position when the piston is forced toward the extended position; and
   a primary input piston spring for biasing the primary input piston to the retracted position.

2. The hydraulic pilot valve of claim 1 wherein the modulator piston valve includes:
   a modulator piston movable between extended and retracted positions in the modulator valve chamber, including:
      a first end in fluid communication with the control system inlet port and configured for engagement with the primary input piston;
      a second end in fluid communication with the control system tank port; and
      a port between the first and second ends;
   a valve for controlling the flow of fluid through the first piston port; and
   a first piston actuating member movable between extended and retracted positions in response to the external mechanical input forces, for actuating the valve and forcing the modulator piston toward the extended position in response to the mechanical input forces.

3. The hydraulic pilot valve of claim 2 wherein the modulator piston valve further includes:
   a second piston actuating member movable between extended and retracted positions in response to the external mechanical input forces, for engaging the first piston actuating member and forcing the first piston actuating member toward the extended position; and
   a modulator piston valve spring between the first and second piston actuating members.

4. The hydraulic pilot valve of claim 3 wherein the valve includes a normally open check valve on the modulator piston which is engaged by the first piston actuating member.

5. The hydraulic pilot valve of claim 2 wherein:
   the modulator piston includes a sleeve extending from the second end, and a port through the sleeve in fluid communication with the control system tank port; and
   the first piston actuating member is movable between extended and retracted positions in the sleeve.

6. The hydraulic pilot valve of claim 5 wherein the valve includes a normally open check valve on the modulator piston which is engaged by the first piston actuating member.

7. The hydraulic pilot valve of claim 6 and further including:
   a second piston actuating member in the piston sleeve and movable between extended and retracted positions in response to the external mechanical input forces, for engaging the first piston actuating member, and
   a modulator piston valve spring between the first and second piston actuating members, for biasing the first piston actuating member away from the second piston actuating member and into engagement with the check valve.

8. The hydraulic pilot valve of claim 1 wherein:
   the primary input piston includes a tapered sleeve-engaging surface;
   the tapered surface is disengaged from the sleeve to fluidly couple the sleeve chamber to the main system tank port when the sleeve and input piston are in the retracted position; and
   the tapered surface engages the sleeve to fluidly isolate the sleeve chamber from the main system tank port and to force the sleeve toward the extended position when the primary input piston is forced toward the extended position.

9. The hydraulic pilot valve of claim 8 wherein:
the valve housing further includes a reservoir chamber adjacent to the sleeve chamber; and
the primary input piston further includes:
a piston end within the sleeve chamber; and
a port through the piston end for fluidly coupling the sleeve chamber to the reservoir chamber.

10. The hydraulic valve of claim 8 wherein the sleeve includes:
a brake port valley in communication with the brake port when the sleeve is in the retracted position; and
a tapered engaging surface which engages the valve housing to fluidly isolate the accumulator port from the brake port valley when the sleeve is in the retracted position, and wherein the brake port valley fluidly couples the accumulator port to the brake port when the sleeve is moved toward the extended position.

11. The hydraulic pilot valve of claim 10 wherein:
the valve housing further includes a reservoir chamber adjacent to the primary valve chamber; and
the primary input piston further includes:
a piston end within the sleeve chamber; and
a port through the piston end for fluidly coupling the sleeve chamber to the reservoir chamber.

12. The hydraulic pilot valve of claim 1 wherein:
the valve housing further includes a reservoir chamber adjacent to the primary valve chamber; and
the primary input piston further includes:
a piston end within the sleeve chamber; and
a port through the piston end for fluidly coupling the sleeve chamber to the reservoir chamber.

13. A hydraulic brake system including the hydraulic pilot valve of claim 1.

14. The hydraulic brake system of claim 13 including:
an accumulator coupled to the accumulator port of the pilot valve;
a main system tank of hydraulic fluid coupled to the main system tank port of the pilot valve;
hydraulically-actuated brakes coupled to the brake port of the pilot valve;
an accumulator pump coupled between the main system tank and the accumulator, for pumping hydraulic fluid to the accumulator;
a control system tank of hydraulic fluid coupled to the control system tank port of the pilot valve;
a control system pump coupled between the control system tank and the control system inlet port, for pumping hydraulic fluid to the control system inlet port, and further coupled between the control system tank and the accumulator, for pumping hydraulic fluid to the accumulator;
an accumulator pressure switch for actuating the control system pump to maintain a predetermined accumulator charge pressure;
a brake pedal;
a brake pedal linkage for coupling external mechanical input forces from the brake pedal to the modulator piston valve; and
a brake switch responsive to motion of the brake pedal and coupled to the control system pump, for actuating the control system pump when the brake pedal is actuated.

15. A hydraulic pilot valve, including:
a valve housing, comprising:
a modulator valve chamber;
a control system inlet port in communication with the modulator valve chamber;
a control system tank port in communication with the modulator valve chamber;
a primary valve chamber adjacent to the modulator valve chamber;
a brake port in communication with the primary valve chamber;
an accumulator port in communication with the primary valve chamber;
a main system tank port in communication with the primary valve chamber; and
a reservoir chamber adjacent to the primary valve chamber;
a modulator piston valve in the modulator valve chamber for controlling a modulating fluid flow between the control system inlet and tank ports to generate amplified input forces in response to the external mechanical input forces, comprising:
a piston movable between extended and retracted positions in the modulator valve chamber and having a first piston port extending therethrough;
a valve for controlling the flow of fluid through the first piston port;
a first piston actuating member movable between extended and retracted positions in response to the external mechanical input forces, for actuating the valve and forcing the piston toward the extended position in response to the mechanical input forces;
a second piston actuating member movable between extended and retracted positions in response to the external mechanical input forces, for engaging the first piston actuating member and forcing the first piston actuating member toward the extended position; and
a modulator piston valve spring between the first and second piston actuating members;
a primary valve sleeve in the primary valve chamber and movable between extended and retracted positions, including:
a sleeve chamber;
a land surface for fluidly isolating the brake port and accumulator port when the sleeve is in the retracted position;
a brake port valley for fluidly coupling the brake port and accumulator port when the sleeve is forced toward the extended position; and
a sleeve port extending through the sleeve for fluidly coupling the sleeve chamber to the brake port;
a primary valve sleeve spring for biasing the primary valve sleeve to the retracted position;
a primary input piston extending into the sleeve chamber and movable from a retracted position toward an extended position in response to the mechanical forces and amplified input forces from the modulator piston valve, the primary input piston including:
a sleeve-engaging surface for fluidly coupling the sleeve chamber to the main system tank port when the piston is in the retracted position, and for fluidly isolating the sleeve chamber and main system tank port and forcing the primary valve sleeve toward the extended position when the piston is forced toward the extended position;
a piston end within the sleeve chamber; and
a port through the piston end for fluidly coupling the sleeve chamber to the reservoir chamber; and
a primary input piston spring for biasing the primary input piston to the retracted position.

\* \* \* \* \*